United States Patent
Li et al.

(10) Patent No.: US 11,159,013 B2
(45) Date of Patent: Oct. 26, 2021

(54) DISCONNECTION AND SWITCH-OVER DEVICE FOR OVERVOLTAGE PROTECTION, PARTICULARLY FOR DC SYSTEMS

(71) Applicant: DEHN SE + CO KG, Neumarkt/Opf. (DE)

(72) Inventors: Hongjun (Better) Li, Shanghai (CN); Niansheng (Jack) Xu, Shanghai (CN); Weie Chen, Shanghai (CN)

(73) Assignee: DEHN SE + CO KG, Neumarkt/Opf. (DE)

( * ) Notice: Subject to any disclaimer, the term of this patent is extended or adjusted under 35 U.S.C. 154(b) by 0 days.

(21) Appl. No.: 16/604,276

(22) PCT Filed: Mar. 19, 2018

(86) PCT No.: PCT/EP2018/056784
§ 371 (c)(1),
(2) Date: Oct. 10, 2019

(87) PCT Pub. No.: WO2018/188897
PCT Pub. Date: Oct. 18, 2018

(65) Prior Publication Data
US 2020/0059089 A1    Feb. 20, 2020

(30) Foreign Application Priority Data
Apr. 11, 2017   (DE) .......................... 102017107871.1

(51) Int. Cl.
*H02H 9/06*  (2006.01)
*H02H 9/04*  (2006.01)
(Continued)

(52) U.S. Cl.
CPC ............. *H02H 9/042* (2013.01); *H01C 7/126* (2013.01); *H02H 7/24* (2013.01); *H02H 9/06* (2013.01); *H01H 63/24* (2013.01)

(58) Field of Classification Search
CPC . H02H 9/042; H02H 9/06; H02H 7/24; H01C 7/126; H01H 63/24; H01H 63/28;
(Continued)

(56) References Cited

U.S. PATENT DOCUMENTS

| 5,299,088 A | 3/1994 | Honl et al. ..................... 361/119 |
| 6,765,777 B2 | 7/2004 | Cantagrel ..................... 361/103 |

(Continued)

FOREIGN PATENT DOCUMENTS

| CN | 101079341 A | 11/2007 | ............. H01C 17/00 |
| CN | 201178306 Y | 1/2009 | ............... H02H 9/04 |

(Continued)

OTHER PUBLICATIONS

Machine Translation of EP245926A1, translated by EPO Patent Translate on Dec. 4, 2020, 15 pages. (Year: 2020).*

(Continued)

*Primary Examiner* — Harry R Behm
(74) *Attorney, Agent, or Firm* — Bodner & O'Rourke, LLP; Gerald T. Bodner; Christian P. Bodner

(57) ABSTRACT

The invention relates to a disconnection and switch-over device for overvoltage protection, particularly for DC systems, comprising at least one arresting element, and a thermal cut-off point incorporated into the electrical interconnect path of the arresting element, the thermal cut-off point comprising a movable mechanically prestressed conductor element that moves from a first position to a second position in the event of a cut-off, and when the second position is reached, an electrical switch-over to a safety device is generated, and the thermal cut-off point is formed (Continued)

(a)  (b)  (c)  (d)

by the movable conductor element and a stationary contact element, the movable conductor element being attached to the stationary contact element by a thermally releasable means. According to the invention, a completely electrical cut-off of the arresting element regarding the interconnect path only occurs when the movable conductor element has gone beyond the second position and has reached a third position, the safety device being arranged in series with the arresting element and the movable conductor element being designed as a wiper or sliding contact in relation to the second position, the second position being created by a bypass end point.

5 Claims, 4 Drawing Sheets

(51) Int. Cl.
  *H01C 7/12* (2006.01)
  *H02H 7/24* (2006.01)
  *H01H 63/24* (2006.01)

(58) Field of Classification Search
  CPC ........ H01H 63/32; H01H 63/38; H01H 67/02; H01H 67/04; H01H 67/06; H01H 67/12
  See application file for complete search history.

(56) References Cited

U.S. PATENT DOCUMENTS

| | | | |
|---|---|---|---|
| 8,861,157 B2 | 10/2014 | Ehrhardt et al. | 361/91.1 |
| 2005/0280971 A1 | 12/2005 | Domejean et al. | 361/111 |
| 2008/0258858 A1 | 10/2008 | Sun | 338/21 |
| 2014/0292472 A1 | 10/2014 | Qin et al. | 337/5 |
| 2014/0313632 A1* | 10/2014 | Hirschmann | H01H 83/10 361/131 |

FOREIGN PATENT DOCUMENTS

| | | | | |
|---|---|---|---|---|
| CN | 101842947 A | 9/2010 | | H01T 1/14 |
| CN | 102132467 A | 7/2011 | | H01C 7/12 |
| CN | 103580014 A | 2/2014 | | H02H 3/22 |
| CN | 203747397 U | 7/2014 | | H02H 3/08 |
| CN | 203950625 U | 11/2014 | | H01C 1/144 |
| CN | 105009246 A | 10/2015 | | H01C 7/12 |
| CN | 206059066 U | 3/2017 | | H01C 1/144 |
| DE | 3734214 A1 | 4/1989 | | H01C 7/12 |
| DE | 3734214 C2 | 11/1991 | | H01C 7/12 |
| DE | 4026004 A1 | 2/1992 | | H01T 1/14 |
| DE | 4124321 A1 | 1/1993 | | H02H 9/04 |
| DE | 102007051854 A1 | 5/2009 | | H01C 7/12 |
| DE | 102008013448 A1 | 5/2009 | | H01C 7/12 |
| EP | 0471167 A1 | 2/1992 | | H01T 1/14 |
| EP | 0860927 A1 | 8/1998 | | H01H 79/00 |
| EP | 1187290 A1 | 3/2002 | | H01C 13/00 |
| EP | 2450926 A1 * | 5/2012 | | H01C 10/50 |
| GB | 1060964 A | 3/1967 | | H01H 31/00 |
| JP | 2014155340 A | 8/2014 | | H01H 85/02 |
| TW | I231078 B | 4/2005 | | H01C 13/00 |
| WO | WO-2008028724 A1 * | 3/2008 | | H01C 7/126 |
| WO | WO2014131564 A1 | 9/2014 | | H01C 7/12 |

OTHER PUBLICATIONS

An Office Action (in German), dated Dec. 21, 2017, issued by the German Patent Office for Applicant's corresponding German Patent Application No. DE102017107871.1, filed Apr. 11, 2017.

The Notification Concerning Transmittal of International Preliminary Report on Patentability (Chapter I of the Patent Cooperation Treaty), in English, dated Oct. 24, 2019, which was issued by the International Bureau of WIPO in Applicant's corresponding international PCT application having Serial No. PCT/EP2018/056784, filed on Mar. 19, 2018.

The English translation of the International Preliminary Report on Patentability (Chapter I of the Patent Cooperation Treaty), dated Oct. 15, 2019, which was issued by the International Bureau of WIPO in Applicant's corresponding international PCT application having Serial No. PCT/EP2018/056784, filed on Mar. 19, 2018.

The Written Opinion of the International Searching Authority, in English, dated Jul. 11, 2018, which was issued by the International Bureau of WIPO in Applicant's corresponding international PCT application having Serial No. PCT/EP2018/056784, filed on Mar. 19, 2018.

The International Search Report, in English, dated Jul. 11, 2018, which was issued by the International Bureau of WIPO in Applicant's corresponding international PCT application having Serial No. PCT/EP2018/056784, filed on Mar. 19, 2018.

* cited by examiner

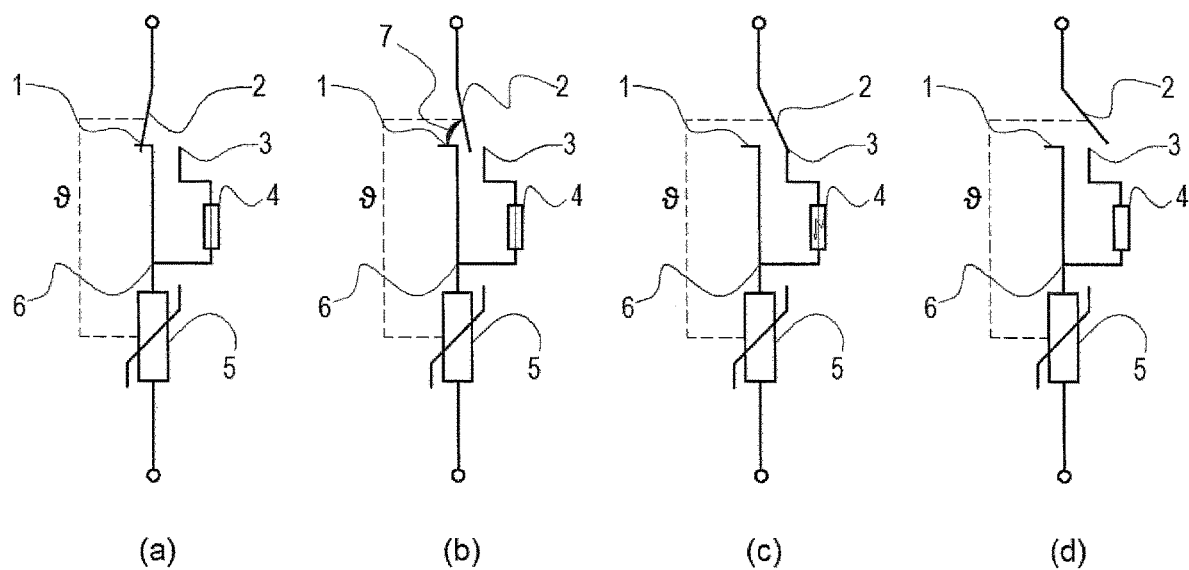
Figur 1

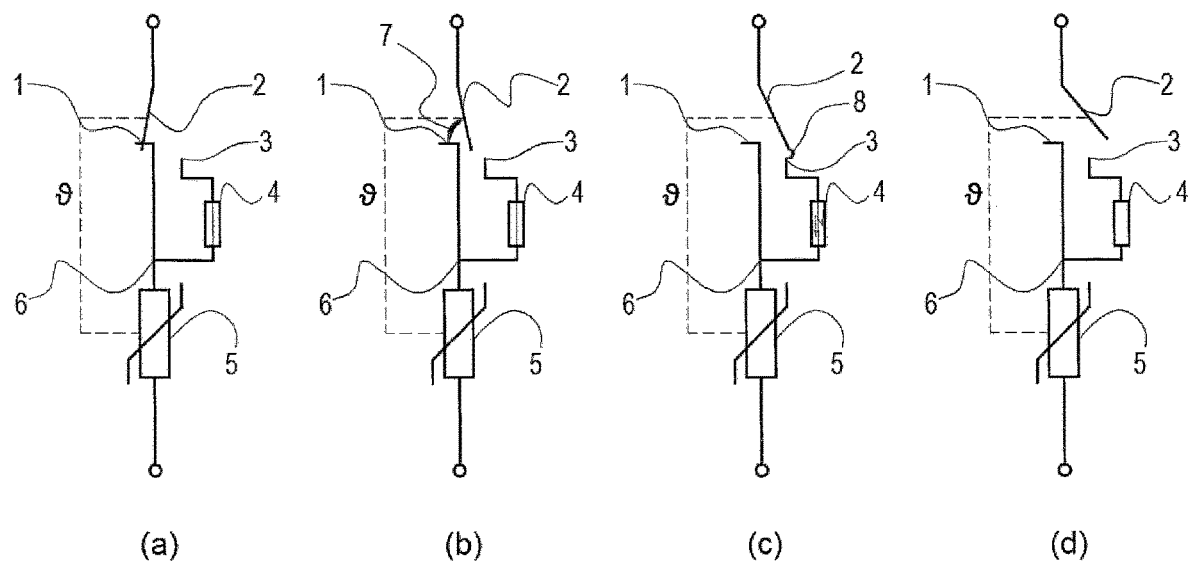
Figur 2

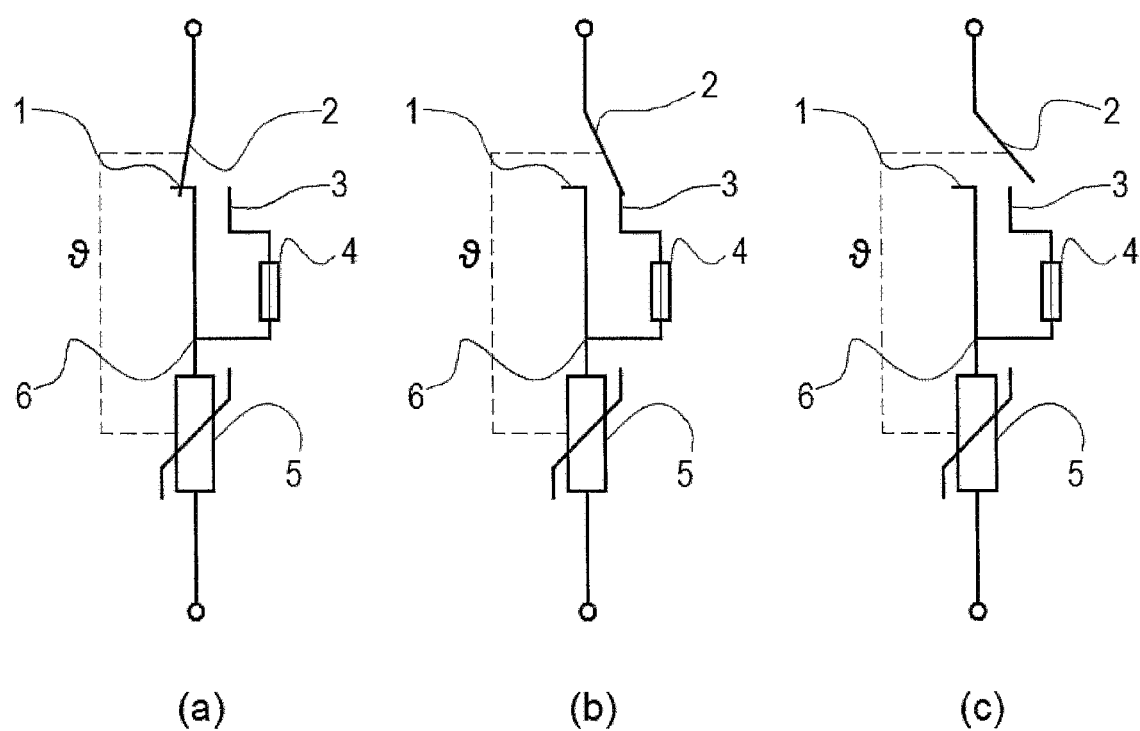
Figur 3

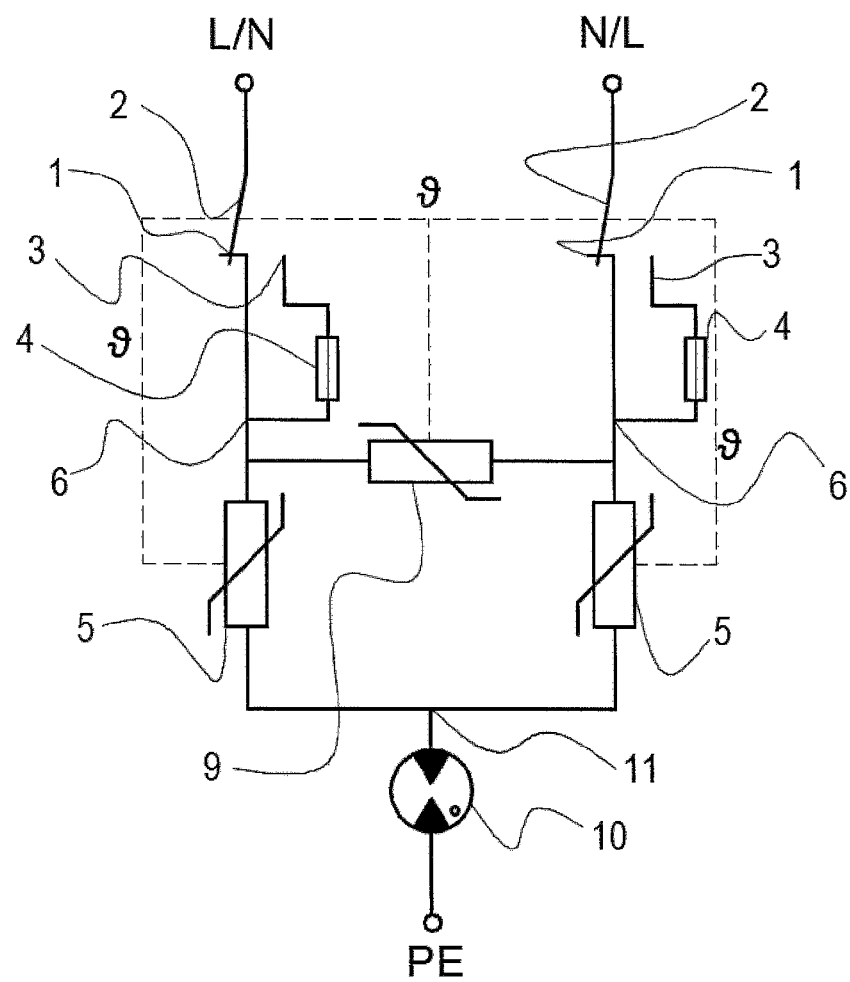
Figur 4

DISCONNECTION AND SWITCH-OVER DEVICE FOR OVERVOLTAGE PROTECTION, PARTICULARLY FOR DC SYSTEMS

The invention relates to a disconnection and switch-over device for overvoltage protection, particularly for DC systems, comprising at least one arresting element, and a thermal cut-off point incorporated into the electrical interconnect path of the arresting element, the thermal cut-off point comprising a movable mechanically prestressed conductor element that moves from a first position to a second position in the event of a cut-off, and when the second position is reached, an electrical switch-over to a safety device is generated, and the thermal cut-off point is formed by the movable conductor element and a stationary contact element, the movable conductor element being attached to the stationary contact element by a thermally releasable means according to claim 1.

From EP 0 860 927 A1 an electromechanical device is already known which monitors current via a varistor and switches the short-circuit in the bypass via electromechanical contacts to the varistor path when a predefined threshold value is exceeded.

DE 37 34 214 C2 discloses a thermally triggerable disconnection device whose switching element represents a changeover contact. The changeover contact closes the varistor circuit in a known way via a soldering point. When the switching element is being triggered, a further contact will be closed which can be interconnected either as an internal or external failure indication or just as a short-circuit via a corresponding external connection.

DE 41 24 321 shows the possibility of an additional safety device for the case that also the connected redundant varistor is damaged after the failure of a varistor. In this respect, the redundant varistor will be disconnected from the voltage supply either by opening a switch in the transverse current path or else by opening the switch in the longitudinal current path. In this case, a disconnection from the mains of the system to be protected and overvoltage protection are performed simultaneously.

In particular in photovoltaic plants, the operating current prevailing there, due to the characteristics of the feeding source, is approximately equal to the short-circuit current. When a varistor is heated, a classical disconnection by a disconnection device is not expedient in such direct voltage applications since the system voltage of photovoltaic plants is up to 1000 volts and the interruption of 1000 volt direct voltage circuits can only be realized at a considerable constructional and/or instrumental expenditure.

According to DE 10 2007 051 854 A1, a conductive element may also be formed as a switching device. The bypass formed by the switching device in the event of a short-circuit is not configured for constant current carrying capacity. After the fault current has flown for a certain time, the bypass is switched off. In this respect, the conductive element may be formed as a safety device. The electric arc generated during opening of the thermal disconnection device is intended to be guided by the contact elements and to extinguish by itself, and that at the latest when the short-circuit contact is reached. Immediately after reaching the short-circuit contact, the arc is then quenched, and current flows via the local bypass which includes a safety device, for example.

It has been shown, however, that during the switch-over, there is an undefined transition area, in which the movable part of the disconnection device has already left the overvoltage arrester but has not come yet into contact with the switching element, for example, a safety device. In this transition area, an electric arc, which may be disadvantageous for the operation of a corresponding device, is burning.

WO 2014/131564 A1 shows a generic disconnection and switch-over device for overvoltage protection.

This disconnection and switch-over device ensures that during the disconnection and switch-over process as a result of the mechanical movement of the corresponding conductor element, undesired electric arcs will not occur, and thus the operational safety of such a device is increased. A complete electrical cut-off of the respective arresting element regarding the interconnect path only occurs when the movable conductor element has reached a second position, referred to therein as switch-over position. This measure ensures that an undesired electric arc will not occur during the movement path of the conductor element.

It has been shown, however, that the already known disconnection and switch-over device does not work satisfactorily under all circumstances. Problems arise in particular, when due to ageing, employed arresting elements, for example, metal oxide varistors, are subjected to slow and creeping heating and the thermal cut-off point is finally released.

In such a case, an unequivocal shut-off function is not given.

The solution of the inventive task is performed by a novel disconnection and switch-over device according to claim 1, the depending claims comprising at least appropriate configurations and further developments.

The disconnection and switch-over device according to the invention offers operational safety in the case of parasitic currents in the milliampere range just as in the case of parasitic currents which are in the ampere or higher ampere range.

The switch-over process to a safety device serves in this case to transmit the switch-off function to the safety device when the varistor as a thermal arresting element is no longer completely operable and, for example, is subjected to ageing damage which resulted in releasing the thermal cut-off point.

After the movable conductor element has reached a third position, there are a complete disconnection from the supply and a safe (fail safe) state.

The invention is in particular applicable advantageously in DC systems but is basically also suitable for alternating current applications, i.e. AC systems.

The invention is thus based on a disconnection and switch-over device for overvoltage protection, comprising at least one arresting element, in particular a varistor and moreover a thermal cut-off point. The thermal cut-off point is incorporated into the electrical interconnect path of the arresting element, the thermal cut-off point comprising a movable conductor element. Being under mechanical prestress, this movable conductor element may cover a defined distance.

In particular, the mechanical prestress works to the extent that, in the event of a cut-off, the movable conductor element will first move from a first position into a second position, wherein, when the second position is reached, an electrical switch-over to a safety device is generated.

The thermal cut-off point is in this case formed by the movable conductor element and a stationary contact element, the movable conductor element being attached to the stationary contact element by a thermally releasable means, for example solder.

According to the invention, a complete electrical cut-off of the arresting element regarding the interconnect path only occurs when the movable conductor element has gone beyond the second position and has reached a third position, the safety device being arranged in series with the arresting element, and the movable conductor element being designed as a wiper or a sliding contact in relation to the second position, the second position being created by a bypass end point.

In an implementation, the movable conductor portion directly touches the bypass end point upon reaching the second position, so that the corresponding pole of the safety device is contacted for a transition moment.

In an embodiment of the invention, the movable conductor portion does not touch the bypass end point upon reaching the second position.

Rather, an electric arc is formed, which then causes the safety device to respond. The contact here is realized virtually indirectly by the electric arc that is generated.

An electric arc, that is primarily formed when the thermal cut-off point is opened, is quenched at the latest when the movable conductor element reaches the second position.

In a further development of the invention, a first safety device pole is in connection with a terminal of the arresting element, and a second safety device pole is in connection with the bypass end point or is an integral part of this bypass end point.

When the conductor element moves from the first into the second position, the drawn primary electric arc virtually constitutes a discharging element. When the second position is reached, the safety device may be caused to respond at sufficient currents. In this case, however, a direct electrical contacting may also be performed by an indirect contacting by a second, virtually secondary electric arc.

When the third position is reached, there is the desired complete cut-off, i.e. disconnection from the supply.

Preferably, the movable conductor element may execute a pivoting movement and get from the first via the second into the third position during this pivoting movement. Of course, a linear movement is also possible as an alternative.

The safety device, which is arranged in series with the arresting element, virtually is situated in parallel to the opener, formed by the thermal cut-off point.

The invention will be explained in more detail below on the basis of exemplary embodiments and referring to Figures.

Shown are in:

FIGS. 1a-1d a first embodiment of the disconnection and switch-over device according to the invention, comprising a metal oxide varistor having a safety device connected in series, and a thermal cut-off point, wherein a movable conductor element, in the event of a cut-off, gets form a first position (FIG. a) through a movement process (FIG. b) into a second position (FIG. c) and, while doing so, directly contacts a bypass end point, and, following this, the complete disconnection position is reached according to FIG. 1d;

FIGS. 2a-2d an embodiment with a bypass end point being not directly contacted, but rather having an indirect contacting by a secondary electric arc (reference numeral 8 according to FIG. 2c), wherein the sequence is otherwise analogous to that described on the basis of FIG. 1;

FIGS. 3a-3c an embodiment of the invention as a principal diagram with an arc-free disconnection operation at flowing currents in the milliampere range with a movement process via the second position (FIG. 3b) right through to the complete disconnection (FIG. 3c); and FIG. 4 a block diagram of a single-phase overvoltage protection device having a thermal arresting element and movable conductor elements, wherein only the initial situation with a closed cut-off point is illustrated in FIG. 4, however, a function similar to that according to FIGS. 1-3 being realizable in the event of overvoltage.

FIGS. 1-4 first have in common the series connection of at least one arresting element 5 and a thermal cut-off point 1, wherein the thermal cut-off point 1 comprises a movable conductor element 2.

To the arresting element, for example, a metal oxide varistor, a safety device 4 is connected in parallel. In this respect, a first safety device pole is in connection with the terminal 6 of the arresting element 5, wherein a second safety device pole is in connection with a bypass end point 3 or is an integral part of this end point 3.

FIG. 4 shows a configuration which, apart from arresting elements 5, further comprises an L-N arresting element 9. At a terminal point 11, the group of arresting elements 5; 9 leads to a gas discharge arrester 10, the other pole thereof being at PE.

In the representation according to FIGS. 1a-1d, a primary electric arc 7 is generated when the thermal cut-off point 1 responds and the movable conductor element 2 starts to move. At a continued virtually wiping movement of the movable conductor element 2 toward the contact 3, i.e. up to the bypass end point, the bypass end point 3 is finally touched and current flows across the safety device 4 which melts.

When the position according to FIG. 1d is reached there is a complete disconnection from the supply.

In the contact configuration that does not directly touch and related to the second position according to FIGS. 2a-2d, the primary electric arc 7 likewise is burning when transiting from the first to the second position (FIG. 2a to FIG. 2b) when the movable conductor element 2 approaches. At the stationary bypass end point 3, a secondary electric arc 8 is burning which potentially causes the safety device 4 to respond.

With progressing movement of the conductor element 2, the position according to FIG. 2d is reached and thus a complete disconnection from the supply achieved.

A similar process results according to FIGS. 3a-3c, but here without an electric arc being drawn, since currents only flow in the milliampere range.

The invention claimed is:

1. A disconnection and switch-over device for overvoltage protection, particularly for DC systems, having at least one arresting element and furthermore a thermal cut-off point (1), wherein the thermal cut-off point (1) comprises a movable conductor element (2) which is under mechanical prestress and moves from a first position into a second position in the event of a cut-off, wherein, when the second position is reached, an electrical switchover to a safety device (4) is generated, the thermal cut-off point (1) is formed by the movable conductor element (2) and a stationary contact element, wherein the movable conductor element (2) is attached to the stationary contact element by a thermally releasable means, characterized in that a complete electrical cut-off of an arresting element (5) regarding the interconnect path is only given when the movable conductor element (2) has gone beyond the second position and has reached a third position, wherein the safety device (4) is arranged in series to the arresting element (5) and the movable conductor element (2) is designed as a wiper or sliding contact in relation to the second position, wherein the second position is realized by a bypass end point (3), characterized in that the movable conductor portion (2) does not touch the bypass end point (3) upon reaching the second position but draws an electric arc (8), which causes the safety device (4) to respond.

2. The disconnection and switch-over device according to claim 1, characterized in that the arresting element is a varistor (5).

3. The disconnection and switch-over device according to claim 1, characterized in that the movable conductor portion (2) touches the bypass end point (3) directly upon reaching the second position, and thus the corresponding pole of the safety device (4) is contacted for a transition moment.

4. The disconnection and switch-over device according to claim 1, characterized in that an electric arc (7), which is formed when the thermal cut-off point (1) is opened, is quenched at the latest when the movable conductor element (2) reaches the second position.

5. The disconnection and switch-over device according to claim 1, characterized in that a first safety device pole is in connection with a terminal (6) of the arresting element (5), and a second safety device pole is in connection with the bypass end point (3) or is an integral part of this bypass end point (3).

\* \* \* \* \*